(12) United States Patent
Lindoff et al.

(10) Patent No.: US 8,477,886 B2
(45) Date of Patent: Jul. 2, 2013

(54) RADIO-RECEIVER CIRCUIT (75) Inventors: Bengt Lindoff, Bjärred (SE); Filip Oredsson, Malmö (SE); Tony Petersson, Malmö (SE); Lars Sundström, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 311 days.

(21) Appl. No.: 12/991,841

(22) PCT Filed: May 6, 2009

(86) PCT No.: PCT/EP2009/055462
§ 371 (c)(1),
(2), (4) Date: Nov. 9, 2010

(87) PCT Pub. No.: WO2009/135868
PCT Pub. Date: Nov. 12, 2009

(65) Prior Publication Data
US 2011/0051849 A1    Mar. 3, 2011

Related U.S. Application Data

(60) Provisional application No. 61/053,371, filed on May 15, 2008.

(30) Foreign Application Priority Data

May 9, 2008 (EP) .................................. 08155936

(51) Int. Cl.
*H04L 27/06* (2006.01)

(52) U.S. Cl.
USPC ....................................................... 375/344

(58) Field of Classification Search
USPC .............. 375/260, 316, 344; 455/130, 161.1, 455/164.1, 164.2, 179.1, 182.1, 182.2, 188.1, 455/192.1, 192.2; 370/203, 210
See application file for complete search history.

(56) References Cited

U.S. PATENT DOCUMENTS

| | | | | |
|---|---|---|---|---|
| 6,744,828 | B1* | 6/2004 | Uchiyama et al. | 375/326 |
| 2006/0008035 | A1* | 1/2006 | Larsson | 375/343 |
| 2006/0133429 | A1* | 6/2006 | Seo et al. | 370/535 |
| 2007/0230603 | A1* | 10/2007 | Sato | 375/260 |
| 2010/0104001 | A1* | 4/2010 | Lee et al. | 375/240 |

FOREIGN PATENT DOCUMENTS
WO   WO 2008/044868 A1   4/2008

* cited by examiner

*Primary Examiner* — Tesfaldet Bocure
(74) *Attorney, Agent, or Firm* — Roger S. Burleigh (57) ABSTRACT

A radio-receiver circuit having an analog-to-digital conversion unit. The analog-to-digital conversion unit comprises an analog-to-digital converter (ADC), and a filter operatively connected to an input terminal of the ADC in a receive path of the radio-receiver circuit. The radio-receiver circuit further comprises a control unit adapted to receive control data and determine, based on the control data, a frequency band in which data is to be transmitted to the radio-receiver circuit during a subsequent time interval. Furthermore, the control unit is operative to adapt at least one frequency characteristic of the analog-to-digital conversion unit to the determined frequency band for receiving said data transmitted in said subsequent time interval.

20 Claims, 6 Drawing Sheets

RADIO-RECEIVER CIRCUIT

PRIORITY CLAIM

This application claims the benefit of U.S. Provisional Application No. 61/053,371, filed May 15, 2008, the disclosure of which is fully incorporated herein by reference.

TECHNICAL FIELD

The present invention relates to a radio-receiver circuit and a method of operating the radio-receiver circuit.

BACKGROUND

In order to facilitate wireless communication at increasing data rates, various new standards and systems for mobile communication are emerging. An example of an emerging cellular system is 3G Long Term Evolution (3G LTE). 3G LTE systems may operate on radio-frequency (RF) channel bandwidths ranging from 1.25 MHz to 20 MHz. Moreover, data rates up to 100 Mb/s may be supported for the largest bandwidth.

In a mobile radio terminal, such as a mobile telephone, it is desirable to have relatively low power consumption, since the energy resources are normally limited by the capacity of a battery. However, normally a relatively high power consumption is needed in a radio-receiver circuit of the mobile radio terminal in order to support reception of data at relatively high data rates, such as the highest data rates in LTE. In order to e.g. avoid excessively rapid draining of batteries in mobile radio terminals, there is a need for reducing the power dissipation in radio-receiver circuits.

One way of reducing power dissipation is given in U.S. Pat. No. 7,295,645, which discloses a transceiver with scalable analog-to-digital conversion resolution and dynamic range that may be used in a wireless local-area network (WLAN). In a reception mode, i.e. when the transceiver is receiving data, the ADC can be operated in a high-precision mode. In a search mode, i.e. when the transceiver is searching for a scanning for a signal of interest, an analog-to-digital converter (ADC) can be operated in a low-power mode, whereby power can be saved. There is, however, a need to even further decrease power dissipation in radio-receiver circuits.

SUMMARY

Accordingly, an object of the present invention is to facilitate a reduction of power dissipation in radio-receiver circuits.

According to a first aspect, a method of operating a radio-receiver circuit is provided. The radio-receiver circuit comprises an analog-to-digital conversion unit comprising an analog-to-digital converter (ADC) and a filter operatively connected to an input terminal of the ADC in a receive path of the radio-receiver circuit. According to the method, control data is received. Furthermore, according to the method, a frequency band in which data is to be transmitted to the radio-receiver circuit during a subsequent time interval is determined based on the received control data. Moreover, at least one frequency characteristic of the analog-to-digital conversion unit is adapted to the determined frequency band for receiving said data transmitted in said subsequent time interval.

The radio-receiver circuit may be adapted to receive data over an orthogonal frequency-division multiplexing (OFDM) communication channel. The control data may be comprised in one or more initial OFDM symbols of a sequence of consecutive OFDM symbols. The subsequent time interval may be a time interval corresponding to one of the OFDM symbols of the sequence of consecutive OFDM symbols that follow after said one or more initial OFDM symbols. The frequency band in which data is to be transmitted to the radio receiver circuit may be a frequency band within the OFDM symbol. In such an OFDM scenario, receiving control data may comprise setting the at least one frequency characteristic of the analog-to-digital conversion unit to a default setting that facilitates reception of data in a frequency band covering the whole OFDM symbol. Furthermore, adapting the at least one frequency characteristic of the analog-to-digital conversion to the determined frequency band may comprise setting the at least one frequency characteristic of the analog-to-digital conversion unit to a setting that facilitates reception of data in the determined frequency band at a reduced power dissipation of the radio-receiver circuit compared with the default setting.

The ADC may be a quantization-noise shaping ADC. Adapting the at least one frequency characteristic of the analog-to-digital conversion unit to the determined frequency band may comprise adapting a noise transfer function (NTF) of the quantization-noise shaping ADC to the determined frequency band. Adapting the NTF of the quantization-noise shaping ADC to the determined frequency band may comprise adapting the NTF such that a zero of the NTF appears essentially in the center of the determined frequency band. Additionally or alternatively, adapting the NTF of the quantization-noise shaping ADC to the determined frequency band may comprise adapting the NTF such that a total amount of quantization noise over the determined frequency band is essentially minimized.

Adapting at least one frequency characteristic of the analog-to-digital conversion unit to the determined frequency band may comprise adapting a frequency response of the filter to the determined frequency band. Adapting the frequency response of the filter to the determined frequency band may comprise adapting a bandwidth of the filter to the determined frequency band. Furthermore, adapting the frequency response of the filter to the determined frequency band may comprise adapting a filter order of the filter to the determined frequency band.

According to a second aspect, a computer program product comprises computer program code means for executing the method according to the first aspect when said computer program code means are run by an electronic device having computer capabilities.

According to a third aspect, a computer readable medium has stored thereon a computer program product comprising computer program code means for executing the method according to the first aspect when said computer program code means are run by an electronic device having computer capabilities.

According to a fourth aspect, a radio-receiver circuit is provided. The radio-receiver circuit comprises an analog-to-digital conversion unit. The analog-to-digital conversion unit comprises an ADC and a filter operatively connected to an input terminal of the ADC in a receive path of the radio-receiver circuit. Furthermore, the radio-receiver circuit comprises a control unit adapted to receive control data and determine, based on the control data, a frequency band in which data is to be transmitted to the radio-receiver circuit during a subsequent time interval. Moreover, the control unit is adapted to adapt at least one frequency characteristic of the analog-to-digital conversion unit to the determined frequency band for receiving said data transmitted in said subsequent time interval.

The radio-receiver circuit may be adapted to receive data over an OFDM communication channel. The control data may be comprised in one or more initial OFDM symbols of a sequence of consecutive OFDM symbols. The subsequent time interval may be a time interval corresponding to one of the OFDM symbols of the sequence of consecutive OFDM symbols that follow after said one or more initial OFDM symbols. The frequency band in which data is to be transmitted to the radio receiver circuit may be a frequency band within the OFDM symbol. In such an OFDM scenario, the control unit may be adapted to set the at least one frequency characteristic of the analog-to-digital conversion unit to a default setting that facilitates reception of data in a frequency band covering the whole OFDM symbol for receiving the control data. Furthermore, the control unit may be adapted to adapt the at least one frequency characteristic of the analog-to-digital conversion unit to the determined frequency band by setting the at least one frequency characteristic of the analog-to-digital conversion unit to a setting that facilitates reception of data in the determined frequency band at a reduced power dissipation of the radio-receiver circuit compared with the default setting.

The ADC may be a quantization-noise shaping ADC and one of the at least one frequency characteristic of the analog-to-digital conversion unit may be an NTF of the quantization-noise shaping ADC. The control unit may be adapted to adapt the NTF of the quantization-noise shaping ADC to the determined frequency band such that a zero of the NTF appears essentially in the center of the determined frequency band. Additionally or alternatively, the control unit may be adapted to adapt the NTF of the quantization-noise shaping ADC to the determined frequency band such that a total amount of quantization noise over the determined frequency band is essentially minimized.

One of the at least one frequency characteristic of the analog-to-digital conversion unit may be a frequency response of the filter. The control unit may be adapted to adapt a bandwidth of the filter to the determined frequency band. Furthermore, the control unit may be adapted to adapt a filter order of the filter to the determined frequency band.

According to a fifth aspect, an electronic apparatus comprises a radio-receiver circuit according to the fourth aspect. The electronic apparatus may be any of, but is not limited to, a portable radio communication equipment, a mobile radio terminal, a mobile telephone, a communicator, an electronic organizer, a smartphone, or a computer.

It is an advantage of embodiments of the invention that a radio-receiver circuit can be dynamically adapted to current utilization of the communication channel (e.g. in terms of signal bandwidth and/or bit rate), whereby a reduction of power dissipation is facilitated.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
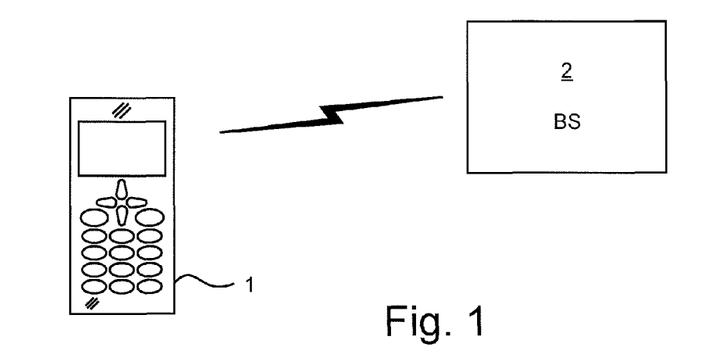
FIG. 1 schematically illustrates a mobile telephone arranged in communication with a base station.

FIG. 1 illustrates an environment where embodiments of the present invention may be employed. An electronic apparatus 1 with radio communication capabilities is adapted to communicate with a base station (BS) 2 via radio signals. In FIG. 1, the electronic apparatus 1 is illustrated as a mobile telephone. However, this is only an example and not intended to limit the scope of the present invention. For example, the electronic apparatus 1 may be, but is not limited to, a portable radio communication equipment, a mobile radio terminal, a communicator, i.e. an electronic organizer, a smartphone, or the like, or a personal computer (PC), e.g. a laptop.

The electronic apparatus 1 may e.g. be adapted for radio communication in one or more types of communication systems, such as but not limited to one or more of GSM (Global System for Mobile communication), UMTS (Universal Mobile Telecommunications System), and 3G LTE (Long Term Evolution) communication systems, and possibly one or more systems operating according to future standards compliant with e.g. IMT (International Mobile Telecommunication) Advanced.

Furthermore, a single BS 2 is used as illustration in FIG. 1. However, this is only an example. The electronic apparatus 1 may be arranged to be operatively connected to a plurality of BSs, operating within the same type or different types of communication systems. For example, the electronic apparatus 1 may be operatively connected to a plurality of BSs in order to facilitate so called soft handover (SHO) between BSs.

In this specification, an electronic apparatus, such as the electronic apparatus 1, which is adapted to communicate with a BS, such as the BS 2, via radio signals is referred to as a mobile terminal (MT). In order to facilitate the understanding of embodiments of the present invention, 3G LTE will be used as an example throughout this specification. For the rest of this specification, 3G LTE will be referred to simply as LTE. In LTE, signals are transmitted using OFDM (Orthogonal Frequency Division Multiplexing) in a multiple access technique referred to as OFDMA (Orthogonal Frequency Division Multiple Access) in the downlink from the BS to the MT. Although LTE is used as an example, embodiments of the present invention may be employed in other types of communication systems as well. As a nonlimiting example, embodiments of the present invention may be employed in other types of OFDM systems, such as but not limited to wireless local-area network (WLAN) systems in accordance with various IEEE 802.11 standards and Wimax systems in accordance with various IEEE 802.16 standards.

Figure 2:
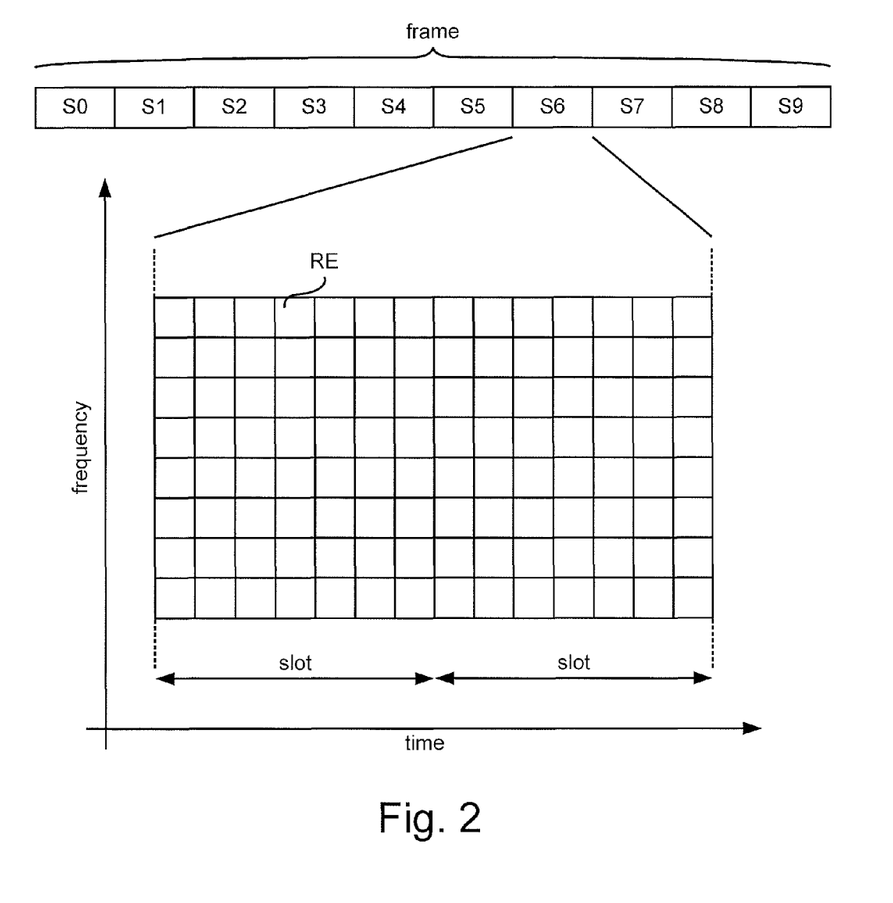
FIG. 2 schematically illustrates signal transmission timing in an LTE communication example.

FIG. 2 illustrates an example of signal timing for a downlink channel in an LTE system. According to the example illustrated in FIG. 2, data is transmitted in the downlink in frames, wherein each frame has a duration of 10 ms. Furthermore, each frame is divided into ten subframes S0-S9, each having a duration of 1 ms. Each subframe is in turn divided into two slots, each having a duration of 0.5 ms. One of the subframes, S6, is shown in more detail in FIG. 2. The view of the subframe S6 shown in FIG. 2 is valid also for the other subframes S0-S5 and S7-S9. In each subframe S0-S9, 12 or 14 OFDM symbols are transmitted in the downlink. The number of symbols depends on the length of the cyclic prefix of each OFDM symbol. In FIG. 2, the number of OFDM symbols in a subframe S0-S9 is 14. Each subframe S0-S9 is divided into a number of resource blocks (RBs). Each RB comprises a number of resource elements (REs), which are represented with squares (one of which is indicated with the reference sign RE) in the more detailed view of the subframe S6 in FIG. 2. Each RE corresponds to a unique subcarrier of a unique OFDM symbol in the subframe S0-S9. Hence, each column of REs in FIG. 2 corresponds to a single OFDM symbol. In FIG. 2, only eight REs are shown for each OFDM symbol. However, as indicated by the dotted lines in FIG. 2, each OFDM symbols may comprise more than eight REs.

Each RB covers a number of adjacent subcarriers in the frequency domain and a number of consecutive OFDM-symbol time intervals in the time domain. Typical numbers for LTE are that an RB covers 12 subcarriers in the frequency domain and one slot (i.e. corresponding to six or seven OFDM symbols depending on the length of the cyclic prefix) in the time domain, and hence consists of 72 or 84 REs. Although it has been suggested for LTE that the frequency band covered by an RB should be the same for each OFDM-symbol time interval covered by the RB (i.e. the RB makes up a rectangle of REs in the time/frequency grid of FIG. 2), some embodiments of the invention are also applicable in a situation where the RB covers different frequency bands for different OFDM-symbol time intervals, i.e. the frequency location of the RB may vary between OFDM symbols. A more generic view, which covers also the latter case, is that an RB defines a nonempty set of adjacent subcarriers for each OFDM symbol of a nonempty set of consecutive OFDM symbols.

An RB may be allocated to a particular MT of a plurality of MTs arranged in communication with a BS. Hence, different data may be transmitted from the BS to different MTs with the same OFDM symbol but on subcarriers belonging to different RBs allocated to the different MTs, whereby multiple channel access is provided.

In the first one, two, or three OFDM symbol(s) of each subframe S0-S9, control data is transmitted in the downlink from the BS to the MTs arranged in communication with the BS. The control data comprises information regarding which RBs of the subframe S0-S9 that are allocated to which MT. By decoding the control data, each MT may determine which subcarriers that carry data transmitted to that particular MT for each OFDM symbol.

Figure 3:
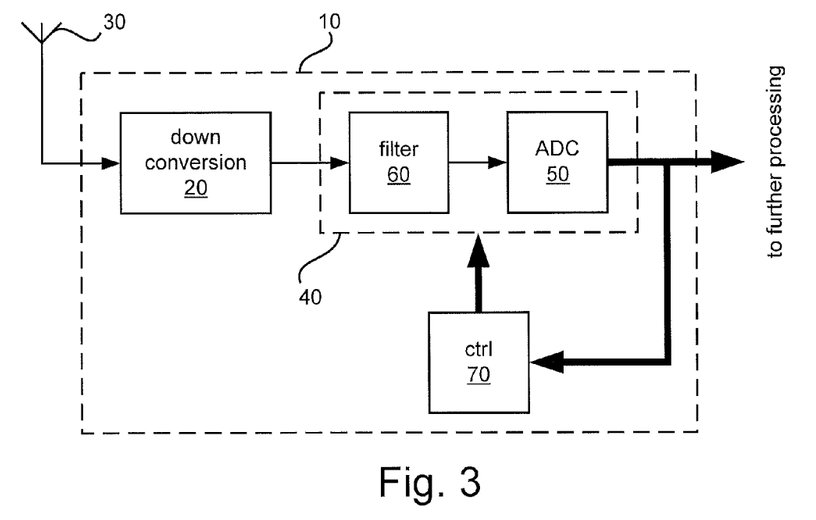
FIG. 3 is a block diagram of a radio-receiver circuit according to an embodiment of the present invention.

FIG. 3 shows a block diagram of a radio-receiver circuit 10 according to an embodiment of the present invention. The radio-receiver circuit 10 may e.g. be comprised in an MT. As illustrated in FIG. 3, the radio-receiver circuit 10 may comprise a downconversion unit 20 adapted to be operatively connected to an antenna 30 for receiving radio frequency (RF) signals. As indicated in FIG. 3, the antenna 30 is not comprised in the radio-receiver circuit 10. Furthermore, although a single antenna 30 is shown in FIG. 3, multiple antennas may be used, e.g. arranged in a multiple-input multiple-output (MIMO) or similar arrangement.

The downconversion unit 20 is adapted to downconvert a received RF signal to a lower frequency band, such as a baseband or an intermediate-frequency (IF) band, to facilitate further processing and demodulation of the received signal. The downconversion unit 20 may e.g. comprise one or more low-noise amplifiers (LNAs), filters, mixers, and/or local oscillators etc. for performing the downconversion according to methods well known in the art. In the embodiments and examples presented in the following of this detailed description, the downconversion unit 20 is adapted to downconvert the received RF signal to a baseband.

Furthermore, the radio-receiver circuit comprises an analog-to-digital conversion unit 40 for converting a downconverted signal into a digital representation. The output signal from the analog-to-digital conversion unit 40 may be subject to further processing, e.g. in a digital baseband circuit (DBB, not shown), e.g. for demodulation and recovery of received data. According to some embodiments, the DBB may be fully or partly comprised in the radio-receiver circuit. According to other embodiments, the DBB may be external to the radio-receiver circuit.

The analog-to-digital conversion unit 40 comprises an analog-to-digital converter (ADC) 50. Furthermore, the analog-to-digital conversion unit 40 comprises a filter 60. The filter 60 is operatively connected to an input terminal of the ADC 50 in a receive path of the radio-receiver circuit 10. Although the filter 60 is illustrated as being directly connected to the input terminal of the ADC 50 in FIG. 3, intervening elements, such as but not limited to further filters, variable gain amplifiers (VGAs), and/or buffer amplifiers, may be present in the path between the filter 60 and the ADC 50.

Moreover, the radio-receiver circuit 10 comprises a control unit 70. The control unit 70 is adapted to receive control data. Furthermore, the control unit 70 is adapted to determine, based on the control data, a frequency band in which data is to be transmitted to the radio-receiver circuit 10 during a subsequent time interval. Moreover, the control unit 70 is adapted to adapt at least one frequency characteristic of the analog-to-digital conversion unit 40 to the determined frequency band for receiving said data transmitted to the radio-receiver circuit in said subsequent time interval. Thereby, as will be elucidated in the context of specific embodiments, a reduction of power dissipation is facilitated, e.g. compared with a radio-receiver circuit wherein an analog-to-digital conversion unit, corresponding to the analog-to-digital conversion unit 40 of the radio-receiver circuit 10, is statically configured e.g. for the highest data rate and/or highest bandwidth, i.e. for a "worst-case scenario". The radio-receiver circuit 10 may be adapted to receive data over an OFDM communication channel. The OFDM communication channel may e.g. be, but is not limited to, an LTE communication channel. The control data may be comprised in one or more initial OFDM symbols of a sequence of consecutive OFDM symbols. For example, in the LTE scenario depicted above, the control unit 70 may be adapted to receive the control data comprised in the first OFDM symbol(s) of each subframe S0-S9. The frequency band, which the control unit 70 is adapted to determine based on the control data, may be a frequency band within the OFDM symbol. Said subsequent time interval, in which data is to be transmitted to the radio-receiver circuit 10 in the determined frequency band, may be a time interval that corresponds to one of the OFDM symbols of the sequence of consecutive OFDM symbols that follow after said one or more initial OFDM symbols. For example, in the LTE scenario depicted above, the control unit 70 may be adapted to determine the frequency band of one or more RBs allocated to an MT, in which the radio-receiver circuit 10 is comprised. Said subsequent time interval could then be the time interval when a particular OFDM symbol, in which REs of said one or more RBs are comprised, is to be transmitted to the MT.

In e.g. LTE, any number (including zero) of the RBs of each slot of a subframe S0-S9 may be allocated to a specific MT. As described above, embodiments of the invention may be applicable both in cases where the frequency band covered by an RB is the same for each OFDM-symbol time interval covered by the RB and in cases where the RB covers different frequency bands for different OFDM-symbol time intervals, i.e. the frequency location of the RB may vary between OFDM symbols. In the latter case, the REs of a specific OFDM symbol in the subframe S0-S9 that are allocated to the specific MT (i.e. the REs belonging to the RBs allocated to the specific MT) may occupy a different frequency band (e.g. in terms of bandwidth and/or center frequency) than the REs of another OFDM symbol of the same subframe that are allocated to the specific MT. Furthermore, in the case where the frequency band covered by an RB is the same for each OFDM-symbol time interval covered by the RB, the frequency band occupied by RBs allocated to a specific MT during the first slot of a subframe S0-S9 may be different from the frequency band occupied by RBs allocated to the specific MT during the second slot of the same subframe S0-S9. Hence, the number of REs allocated to a specific MT and/or the subcarrier location associated with the REs allocated to the specific MT may be different for different OFDM symbols of a subframe S0-S9. Hence, the control unit 70 may be adapted to determine a plurality of frequency bands based on the control data, wherein each one of the plurality of frequency bands is associated with a unique subsequent time interval (e.g. unique OFDM symbol in LTE) in which data is to be transmitted to the radio-receiver circuit 10 in the associated frequency band. For each such subsequent time interval, the control unit 70 may be adapted to adapt the at least one frequency characteristic of the analog-to-digital conversion unit 40 to the corresponding determined frequency band. Hence, several adaptations to different frequency bands in different time intervals may be made based on the same control data.

According to some embodiments, wherein the radio-receiver circuit is adapted to receive data over an OFDM communication channel, the control unit 70 is adapted to set the at least one frequency characteristic of the analog-to-digital conversion unit 40 to a default setting that facilitates reception of data in a frequency band covering the whole OFDM symbol for receiving the control data. For example, in LTE, the whole bandwidth of the OFDM symbol may be utilized for transmitting the control data during the first OFDM symbol (s) of each subframe S0-S9. Therefore, in order to properly receive and decode the control data, the radio-receiver circuit 10 may need to be capable of receiving the whole OFDM symbol for the first OFDM symbol(s) of each subframe S0-S9. Furthermore, the control unit 70 may be adapted to adapt the at least one frequency characteristic of the analog-to-digital conversion unit 40 to the determined frequency band by setting the at least one frequency characteristic of the analog-to-digital conversion unit 40 to a setting that facilitates reception of data in the determined frequency band at a reduced power dissipation of the radio-receiver circuit 10 compared with the default setting. Examples of such settings are presented in the context of specific embodiments.

After having received the first OFDM symbol(s), in which the control data is comprised, the control unit 70 may need additional time to decode the control data. Therefore, the default setting may need to be used for the reception of a few OFDM symbols that follow after the first OFDM symbol(s), in which the control data is comprised, before the control data has been decoded. Having decoded the control data, the control unit 70 is able to adapt the at least one frequency characteristic of the analog-to-digital conversion unit 40 based on the control data. In LTE, it will normally be possible for the control-unit 70 to complete the decoding of the control data at least by the end of the first slot of a subframe S0-S9. Hence, normally, it will be possible for the control unit 70 to adapt the at least one frequency characteristic of the analog-to-digital conversion unit 40 based on the control data at least during the second slot of the subframe S0-S9.

According to some embodiments, the ADC 50 is implemented as a quantization-noise shaping ADC, such as a delta-sigma ADC. One of the at least one frequency characteristic that the control unit 70 is adapted to adapt to the determined frequency band may be a noise transfer function (NTF) of the quantization-noise shaping ADC.

Figure 4:
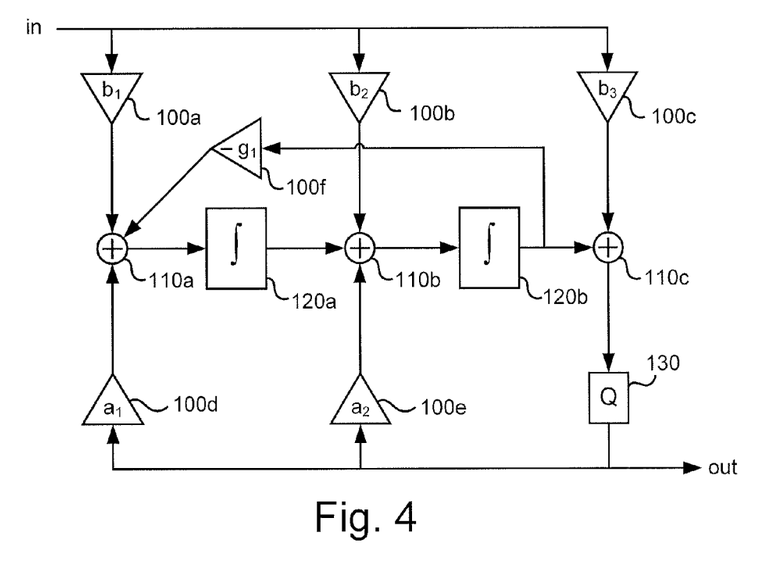
FIG. 4 is a signal-flow graph of a second-order delta-sigma ADC according to an embodiment of the present invention.

FIG. 4 shows a signal-flow graph of a second-order delta-sigma ADC according to an embodiment of the present invention. The structure illustrated in FIG. 4 is normally referred to as a "cascade of integrators with distributed feedback", or CIFB. The CIFB structure is used herein as an example, but other delta-sigma ADC topologies may be employed as well. The signal-flow graph in FIG. 4 includes six multiplication elements 100*a-f*, three addition elements 110*a-c*, two discrete-time integrators, or accumulators, 120*a-b*, and a quantizer 130. The signal-flow graph shown in FIG. 4 may e.g. be implemented with a switched-capacitor circuit.

Although a delta-sigma ADC with a discrete-time loop filter, wherein the integrators 120*a-b* are discrete-time integrators, is considered in examples with reference to FIG. 4, the delta-sigma ADC may well, in some embodiments, have a continuous-time loop filter, wherein the integrators 120*a-b* are continuous-time integrators.

Analog input samples to the delta-sigma ADC enter the signal-flow graph at the label "in" in FIG. 4. The quantizer 130 compares the output of the addition element 110*c* with a threshold level and outputs a 1-bit signal that is '1' if the output of the addition element is larger than or equal to the threshold level and '0' otherwise. Hence, the quantizer 130 quantizes the output from the addition element to a 1-bit signal. A 1-bit quantizer is used herein as an example, but multi-bit quantizers may be employed as well. A 1-bit quantizer typically results in a relatively large amount of quantization noise. However, by properly selecting the factors $a_1$, $a_2$, and $g_1$, the quantization noise can be shaped such that there is a relatively small amount of quantization noise power in a signal frequency band of interest, whereas a relatively large amount of the quantization noise appear outside of said signal frequency band of interest. The power spectral density of the quantization noise is determined by the NTF of the delta-sigma ADC. The NTF is defined by a set of poles determining the order of the NTF and the delta-sigma ADC. In general these poles can be designed more or less aggressively to control the in-band level of quantization noise at the expense of potential instability. In addition to the poles, the NTF may contain zeros as well, and their positions in frequency define local minima in the NTF. The introduction of zeros does not minimize the total level of quantization noise, but rather results in a redistribution of the quantization noise power. Thus, one or more zeros can be introduced to minimize quantization noise over one or a few frequency ranges at the expense of increased noise for other frequency ranges. A relatively high oversampling ratio (OSR) is normally used to facilitate efficient noise shaping. Delta-sigma ADCs are known in the art, and are therefore not described in great detail herein.

In the following, some examples are presented, with reference to the signal-flow graph in FIG. 4, in order to illustrate how the control-unit 70 may adapt the NTF of a delta-sigma ADC. In the examples, the following parameter values are used for the multiplication elements 100a-e in FIG. 4: $a_1=1$; $a_2=2$; $b_1=1$; and $b_2=b_3=0$.

Figure 5A:
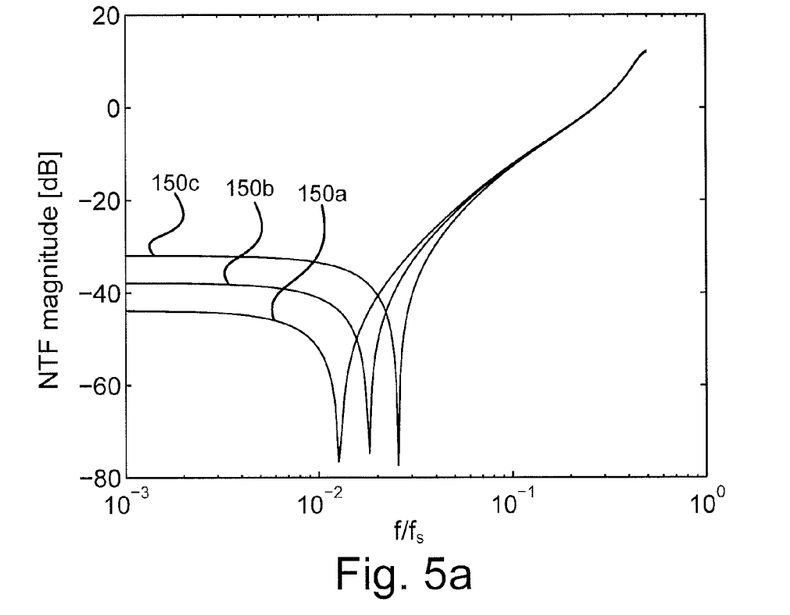
FIGS. 5a and b show noise-transfer functions for various configurations of the delta-sigma ADC of FIG. 4.

The parameter $g_1$ of the multiplication element 100f in FIG. 4 may be selected to control the frequency position of a zero according to:

$$f_z = \frac{\sqrt{g_1}}{2\pi} f_s,$$

where $f_z$ is the frequency position of the zero and $f_s$ denotes the sampling frequency of the delta-sigma ADC. In FIG. 5a, the magnitude function of the NTF is plotted for various values of $g_1$. The magnitude function for $g_1=0.0064$ is labeled 150a, the magnitude function for $g_1=0.0128$ is labeled 150b, and the magnitude function for $g_1=0.0256$ is labeled 150c. It is apparent from the plots in FIG. 5a that the lower the position of the zero is, the lower is the low frequency NTF magnitude. If a signal transmitted to the radio-receiver circuit 10 does not utilize the maximum signal bandwidth of the communication channel, the control unit 70 may consequently control the position of the zero to reduce the amount of quantization noise in the frequency band actually used. This reduction of quantization noise in the signal band may facilitate a reduction of power dissipation in the radio-receiver circuit 10. For example, signal currents of the delta-sigma ADC may be reduced. In order to preserve the voltage swing when the signal currents are reduced, the impedance levels in the analog circuitry of the delta-sigma ADC may be increased. This, in turn, facilitates a reduction of the DC currents drawn by the various circuitry in the delta-sigma ADC (e.g. integrators, amplifiers, feedback digital-to-analog converters (DACs), etc). Provided that the voltage swings are held constant by compensating for reduced signal currents as mentioned above, the SNR due to thermal noise is approximately proportional to the current consumption of the delta-sigma ADC. As a nonlimiting example, if the thermal noise power is allowed to double due to a reduction of quantization noise power, the current consumption (and consequently the power dissipation) can be halved. Furthermore, to some extent, the reduction in quantization noise power may additionally or alternatively be utilized for reducing the sampling frequency of the delta-sigma ADC, whereby a reduction of dynamic power dissipation is facilitated. Hence, by appropriately adapting the NTF of the delta-sigma ADC, a reduction of power dissipation is facilitated in the radio-receiver circuit 10. A reduction of quantization noise power within the signal band may also be utilized to improve the performance, e.g. in terms of achievable data rate. A trade-off between reduced power dissipation and improved performance may be made; the reduction of quantization noise within the signal band may be utilized partly to reduce the power dissipation and partly to improve the performance. The trade-off could e.g. be based on bit-rate requirements of a service that is currently in use; if a lower bit rate is required, the reduction in quantization noise power can be utilized to reduce the power dissipation to a larger extent than if a higher bit rate is required.

Figure 5B:
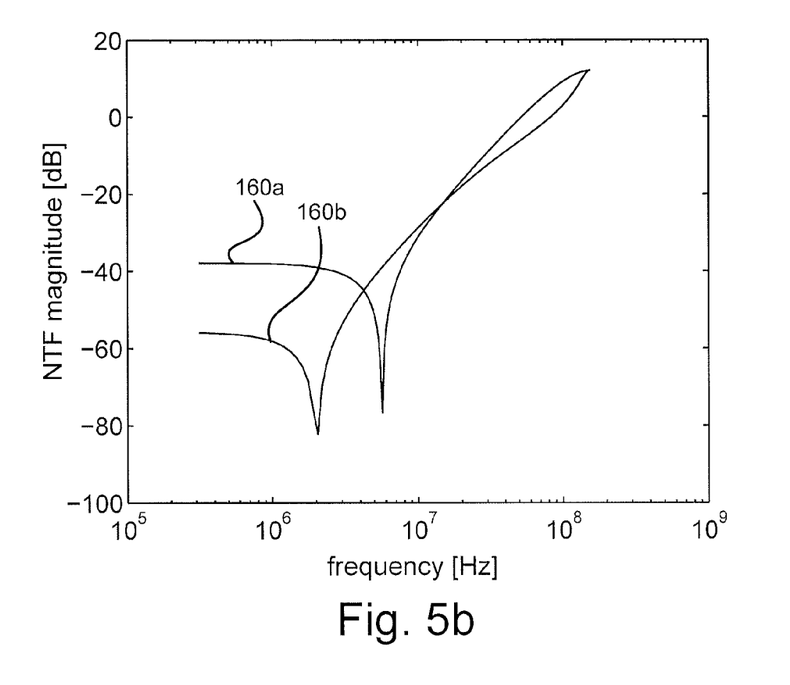

A specific example relating to signal reception in LTE, utilizing the same parameter values for the multiplication elements 100a-e as in the examples of FIG. 5a, is presented below with reference to FIG. 5b. A 20 MHz RF channel bandwidth is used in the example. The full baseband signal bandwidth of the OFDM symbols in the downlink is 9 MHz, and the bandwidth allocated by one RB is 180 kHz. In this example, the sampling frequency $f_s$, of the delta-sigma ADC is set to 312 MHz. For the first OFDM symbol(s) in a subframe, i.e. the OFDM symbol(s) that comprise the control data, the zero of the NTF is set to minimize the total quantization noise power over the 9 MHz signal bandwidth. In this example, this is achieved by setting the frequency of the zero to 5.62 MHz. The magnitude function of the NTF for this placement of the zero is shown in FIG. 5b, labeled 160a. The quantization noise power within this bandwidth amounts to −60 dB relative to the total quantization noise integrated up to $0.5\,f_s$. In the example, the control data indicates that a single RB is allocated to the MT in which the radio-receiver circuit 10 is comprised. The center frequency of the allocated RB is 2 MHz. To facilitate reception of the allocated RB, the control unit 70 adapts the NTF of the delta-sigma ADC by setting the frequency of the zero of the NTF to 2 MHz. The resulting magnitude function of the NTF for this placement of the zero is plotted in FIG. 5b, labeled 160b. It can be observed that a dip in the NTF appears around the center frequency 2 MHz of the allocated RB. The quantization noise power within the 180 kHz wide frequency band centered at 2 MHz is −118 dB relative to the total quantization noise integrated up to $0.5\,f_s$. The averaged power spectral density (PSD) over this 180 kHz wide frequency band is approximately −171 dB/Hz. This can be compared with the configuration where the frequency location of the zero is set to 5.62 MHz. For that configuration, the averaged PSD over the whole 9 MHz signal bandwidth is approximately −130 dB/Hz. Hence, for a single allocated RB, there is a potential of reducing the quantization noise density in the order of 40 dB by placing the zero of the NTF in the center of the frequency band of the RB instead of minimizing the total quantization noise over the whole 9 MHz signal bandwidth. Other noise sources than quantization, e.g. thermal noise, may however limit the overall achievable improvement to less than 40 dB. An improvement of at least 10-15 dB could, however, be reasonable to expect in many cases.

As illustrated with the example above, the control unit 70 may be adapted to adapt the NTF of the delta-sigma ADC to the determined frequency band such that a zero of the NTF appears essentially in the center of the determined frequency band. This may e.g. be useful if the determined frequency band is relatively narrow and to a large extent fits within the "dip" of the NTF that appears around the frequency of the zero.

The control unit 70 may be adapted to adapt the NTF of the delta-sigma ADC to the determined frequency band such that a total amount of quantization noise over the determined frequency band is minimized or essentially minimized. If the determined frequency band is relatively narrow, this may be accomplished by placing the zero of the NTF essentially in the center of the determined frequency band, as described above. However, for a wider frequency band, placing the zero essentially in the center of the determined frequency band may be a suboptimal solution.

Appropriate parameter settings for the delta-sigma ADC may be stored in a look-up table (LUT, not shown), which e.g. may be addressed with a center frequency and a bandwidth of the determined frequency band, or other parameters indicative of or derived from the determined frequency band. The control unit 70 may be adapted to retrieve the appropriate parameter settings from the LUT and adapt the NTF of the delta-sigma ADC utilizing the retrieved parameter values. The appropriate parameter values, to be stored in the LUT, may e.g. be determined by means of computer simulation.

According to some embodiments, one of the at least one frequency characteristic of the analog-to-digital conversion unit 40 that the control unit 70 is adapted to adapt to the determined frequency band is a frequency response of the filter 60. For example, the control unit 70 may be adapted to adapt a bandwidth of the filter 60 to the determined frequency band. Consider for example an LTE scenario with a total baseband signal bandwidth of 9 MHz (i.e. the total bandwidth of the OFDM symbols in the baseband is 9 MHz). In the default setting, the filter 60 may be set to have a bandwidth of 9 MHz in order to facilitate reception of the control data comprised in the first OFDM symbol(s). If the control data indicates that data to be transmitted to the radio-receiver circuit 10 during the subsequent time interval does not utilize frequencies all the way up to 9 MHz, the bandwidth of the filter 60 may be reduced compared with the default setting. By reducing the filter bandwidth, the power dissipation in the filter may be reduced. For example, if the filter 60 is implemented as a Gm-C filter, the bandwidth of the filter 60 may be reduced by reducing transconductance ($g_m$) values of one or more transconductors in the filter 60. Reducing $g_m$ of a transconductor may normally be achieved by reducing a dc bias current of the transconductor, whereby power dissipation may be reduced. The control unit 70 may additionally be adapted to adapt the filter order of the filter 60 to the determined frequency band. For example, with reference to the LTE example above, if the control data indicates that data to be transmitted to the radio-receiver circuit 10 during the subsequent time interval does not utilize frequencies all the way up to 9 MHz, the order of the filter 60 may be reduced compared with the default setting, as will be described with reference to FIGS. 6 and 7a-c. A reduction of filter order may allow one or more active elements (e.g. operational amplifiers, operational transconductance amplifiers, and/or transconductors) in the filter 60 to be disabled, or powered off, whereby power dissipation may be reduced compared with the default setting.

Figure 6:
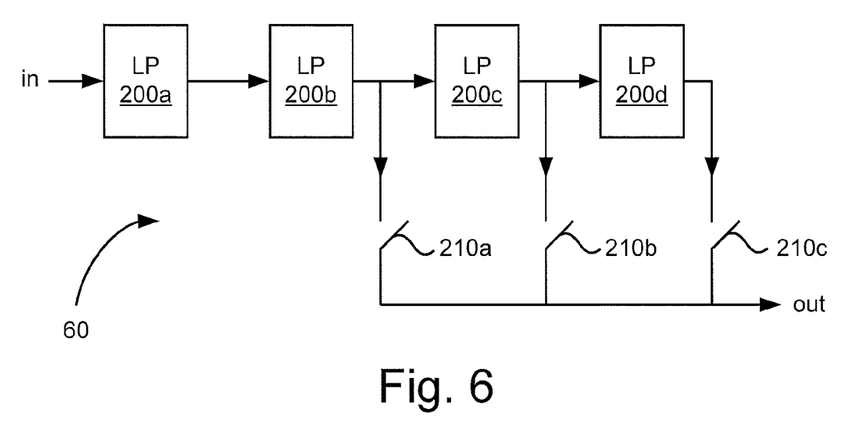
FIG. 6 is a block-diagram of a filter according to an embodiment of the present invention.

FIG. 6 shows a block-diagram of the filter 60 according to an embodiment of the invention. According to this embodiment, the filter 60 comprises a number of low-pass (LP) filter sections 200a-d connected in cascade. Each LP filter section 200a-d may have any filter order. However, in examples described below with reference to FIG. 6, it is assumed that the LP filter sections 200b-d are second-order filter sections (e.g. biquad filter sections) and that the LP filter section 200a is a first-order filter section. The LP filter section 200a may e.g. be implemented as a passive RC link, thereby dissipating a relatively small amount of power (e.g. compared with an active first-order filter section). Each one of LP filter sections 200b-d may be implemented as an active filter section, e.g. as a Gm-C or active-RC filter section.

Furthermore, according to the embodiment of FIG. 6, the filter 60 comprises a number of selector devices, or switches, 210a-c. By closing the selector device 210a and keeping the selector devices 210b and c open, the control unit 60 may select the output signal of the filter section 200b as the output signal of the filter 60, whereby a third-order filter is obtained. Furthermore, by closing the selector device 210b and keeping the selector devices 210a and c open, the control unit 60 may select the output signal of the filter section 200c as the output signal of the filter 60, whereby a fifth-order filter is obtained. Moreover, by closing the selector device 210c and keeping the selector devices 210a and b open, the control unit 60 may select the output signal of the filter section 200d as the output signal of the filter 60, whereby a seventh-order filter is obtained. In addition to selecting the filter order by means of the selector devices 210a-c, the control unit 70 may be adapted to control the frequency response of one or more of the LP filter sections 200a-d, e.g. in terms of the location of individual poles and/or zeros. An LP filter section 200a-d may e.g. comprise a passive component, having a value that is controllable from the control unit 70. For example, a capacitor with controllable capacitance value may be implemented with a plurality of capacitors, which can be selectively connected in parallel by means of switches that are controllable from the control unit 70. Thereby, not only the order of the filter 60 can be controlled from the control unit 60, but also locations of individual poles and/or zeros of the filter 60, which facilitates adaptation of the filter 60 to different filter requirements. Tuning of the response of a filter section based on controlling parameters of one or more passive components of the filter section is known in the art and, therefore, not described in further detail in this specification.

Figure 7A:
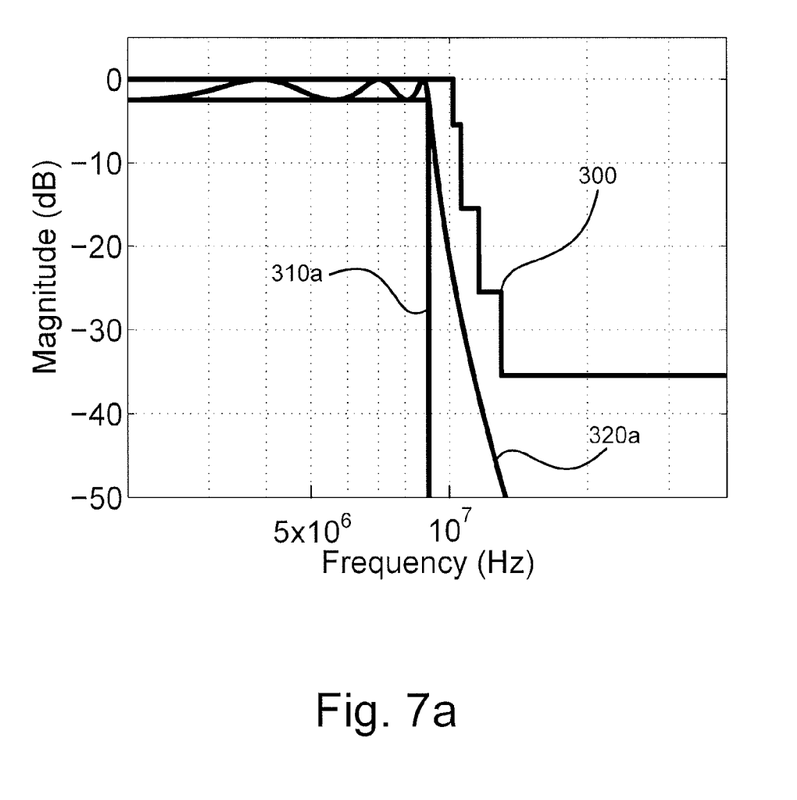
FIGS. 7a-c show magnitude responses for various configurations of the filter of FIG. 6.
Figure 7B:
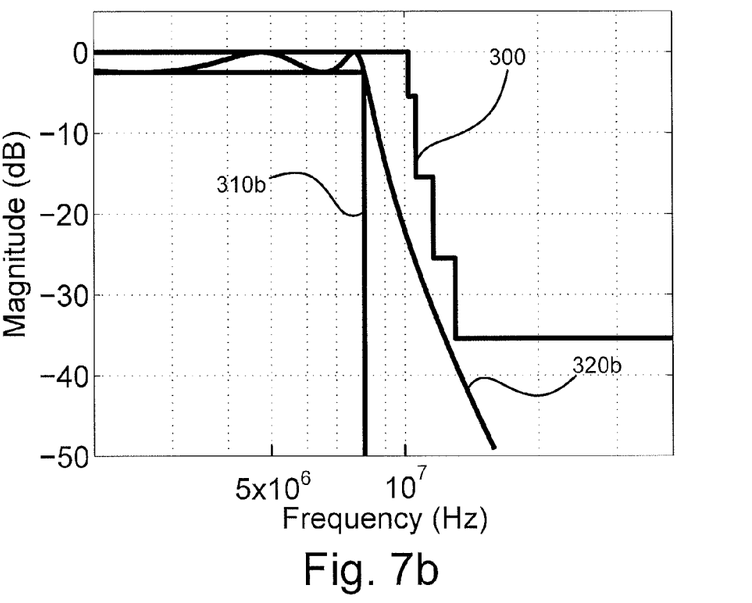
Figure 7C:
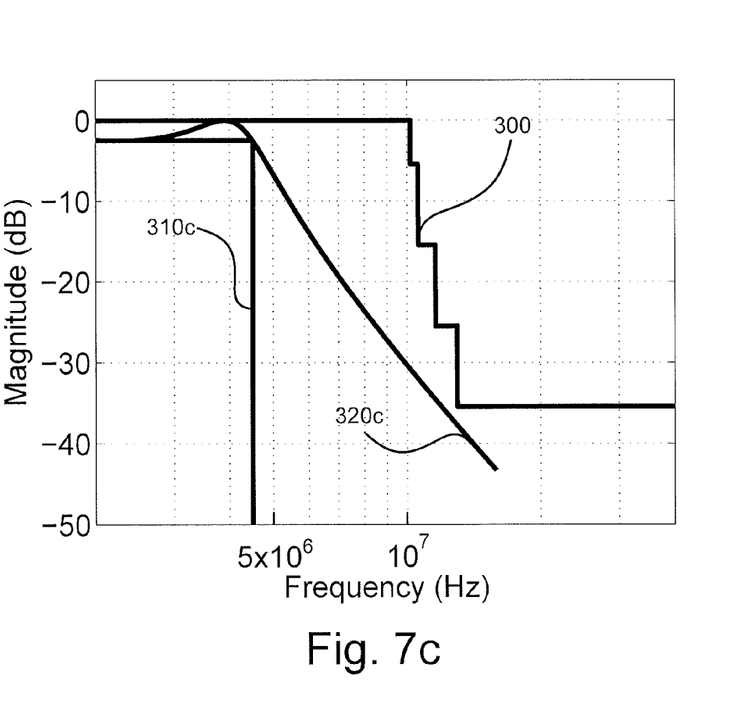

FIGS. 7a-c show magnitude responses for various configurations of the filter of FIG. 6 according to examples used for illustrations. In FIGS. 7a-c, a selectivity mask 300 is shown, which is identical for all of the FIGS. 7a-c. The selectivity mask 300 indicates a requirement on the minimum attenuation of the filter 60, which is selected in order to properly attenuate signals in adjacent frequency channels. The selectivity mask 300 for the examples illustrated in FIGS. 7a-c has be chosen suitable for an LTE system with 18 MHz radio-frequency (RF) signal bandwidth and a corresponding baseband signal bandwidth (i.e. bandwidth of the full OFDM symbol in the baseband) of 9 MHz.

FIG. 7a illustrates a case where the full 9 MHz signal bandwidth is used. The box 310a indicates the maximum allowed attenuation. For the example, the maximum allowed attenuation within the passband (i.e. frequency range from 0-9 MHz) has been set to 2.5 dB. To fulfill the filter requirements, the magnitude response of the filter 60 should fall between the box 310a and the selectivity mask 300. It has been concluded that the filter requirements for this example can be fulfilled with a seventh order Chebyshev I filter. Actually, a sixth-order Chebyshev I filter would suffice. However, since the embodiment of the filter 60 illustrated in FIG. 6 can be configured as a third, fifth, or seventh order filter, a seventh-order filter is selected. As described above, the addition of the first order LP filter section 200a can be made at a relatively low cost in terms of power dissipation if the LP filter section 200a is implemented with a passive RC-link. Hence, the additional cost of selecting a seventh-order filter instead of a sixth-order filter is normally negligible. The magnitude response of a seventh-order Chebyshev I filter that fulfills these filter requirements is plotted in FIG. 7a, labeled 320a. In order to realize this magnitude response with the filter 60, the control unit 70 closes selector device 210c and keeps the selector devices 210a and b open for obtaining a seventh-order filter. Furthermore, the control unit 70 controls the location of individual poles and/or zeros of the filter 60, such that the desired frequency response is obtained. The frequency response of the filter 60 illustrated in FIG. 7a may be the frequency response of the default setting of the filter 60.

FIG. 7b illustrates a case where only 90% of the full 9 MHz signal bandwidth (i.e. a 8.1 MHz bandwidth) is used. The box 310b indicates the maximum allowed attenuation. As for the example illustrated in FIG. 7a, the maximum allowed attenuation within the passband (i.e. frequency range from 0-8.1 MHz) has been set to 2.5 dB. To fulfill the filter requirements, the magnitude response of the filter 60 should fall between the box 310b and the selectivity mask 300. It has been concluded that the filter requirements for this example can be fulfilled with a fifth order Chebyshev I filter. The magnitude response of a fifth-order Chebyshev I filter that fulfills these filter requirements is plotted in FIG. 7*b*, labeled 320*b*. In order to realize this magnitude response with the filter 60, the control unit 70 closes selector device 210*b* and keeps the selector devices 210*a* and *c* open for obtaining a fifth-order filter. Furthermore, the control unit 70 controls the location of individual poles and/or zeros of the filter 60, such that the desired frequency response is obtained. Since the output signal from the LP filter section 200*d* is not used in this configuration, the LP filter section 200*d* can be disabled, or powered off. Assuming as a first order approximation that each of the LP filter sections 200*b-d* contributes to approximately ⅓≈33% of the total power dissipation of the filter 60, an approximate 33% reduction in power dissipation in the filter 60, compared with the example illustrated in FIG. 7*a*, may be obtained by adapting the frequency response of the filter 60 to the determined frequency band. In practice, the achievable reduction in power dissipation in the filter 60 may be less than 33%. For example, other components of the filter 60 than the LP filter sections 200*b-d* may contribute to a not insignificant part of the total power dissipation of the filter 60, whereby the contribution of the LP filter section 200*d* to the total power dissipation of the filter 60 could be less than 33%. Furthermore, it may not be possible to completely power off the LP filter section 200*d*, since the transients that occur when powering on the LP filter section 200*d* again could then be too large and thereby deteriorate the signal. Hence, the LP filter section 200*d* may instead need to be set in a low-power mode, where active elements of the LP filter section 200*d* consume a small but nonzero standby current to avoid detrimental transients when the LP filter section 200*d* is powered on again.

FIG. 7*c* illustrates a case where only 50% of the full 9 MHz signal bandwidth (i.e. a 4.5 MHz bandwidth) is used. The box 310*c* indicates the maximum allowed attenuation. As for the examples illustrated in FIGS. 7*a-b*, the maximum allowed attenuation within the passband (i.e. frequency range from 0-4.5 MHz) has been set to 2.5 dB. To fulfill the filter requirements, the magnitude response of the filter 60 should fall between the box 310*c* and the selectivity mask 300. It has been concluded that the filter requirements for this example can be fulfilled with a third order Chebyshev I filter. The magnitude response of a third-order Chebyshev I filter that fulfills these filter requirements is plotted in FIG. 7*c*, labeled 320*c*. In order to realize this magnitude response with the filter 60, the control unit 70 closes selector device 210*a* and keeps the selector devices 210*b* and *c* open for obtaining a third-order filter. Furthermore, the control unit 70 controls the location of individual poles and/or zeros of the filter 60, such that the desired frequency response is obtained. Since the output signals from the LP filter sections 200*c* and *d* are not used in this configuration, the LP filter sections 200*c* and *d* can be disabled, or powered off. Assuming again, as a first order approximation, that each of the LP filter sections 200*b-d* contributes to approximately ⅓≈33% of the total power dissipation of the filter 60, an approximate ⅔≈67% reduction in power dissipation in the filter 60, compared with the example illustrated in FIG. 7*a*, may be obtained by adapting the frequency response of the filter 60 to the determined frequency band. In practice, the achievable reduction in power dissipation in the filter 60 may be less than 67%, e.g. for the reasons discussed in the context of FIG. 7*b*.

Appropriate parameter settings for the filter 60 may be stored in a look-up table (LUT, not shown), which e.g. may be addressed with one or more parameters indicative of or derived from the determined frequency band, e.g. a maximum frequency of the determined frequency band, or parameters from which the maximum frequency of the determined frequency band can be derived, such as but not limited to a center frequency and a bandwidth of the determined frequency band. The control unit 70 may be adapted to retrieve the appropriate parameter settings from the LUT and adapt the frequency response of the filter 60 utilizing the retrieved parameter values. The appropriate parameter values, to be stored in the LUT, may e.g. be determined by means of computer simulation. In some embodiments, the same LUT is used for storing appropriate parameter settings for the NTF of the delta-sigma ADC and the frequency response of the filter 60.

When settings of the analog-to-digital conversion unit 40 are changed in order to adapt a frequency characteristic of the analog-to-digital conversion unit 40, such as an NTF of a delta-sigma ADC and/or a frequency response of the filter 60, signal transients may occur. Such signal transients may impair the signal quality. In an OFDM system, a cyclic prefix is added to each OFDM symbol in order to reduce inter-symbol interference. For example, part of the end (in the time domain) of the OFDM symbol may be duplicated and inserted at the beginning of the OFDM symbol. Thereby, a guard interval is obtained between OFDM symbols, whereby interference between consecutive OFDM symbols, e.g. caused by multipath signal propagation, can be reduced. According to some embodiments, the changes to the settings of the analog-to-digital conversion unit 40 are applied during a guard interval, such as during the cyclic prefix of an OFDM symbol. Thereby, transients caused by the changed settings can be allowed to fade out and not significantly impair the quality of the received signal.

Figure 8:
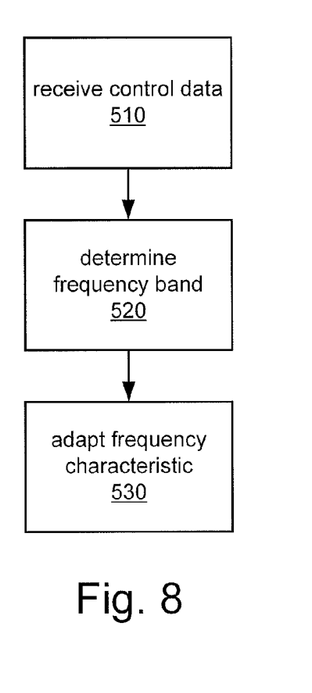
FIGS. 8 and 9 show flow charts of a method according to embodiments of the present invention.

According to some embodiments of the invention, a method of operating the radio-receiver circuit 10 (FIG. 3), is provided. The method may e.g. be performed by the control unit 70 (FIG. 3). FIG. 8 shows a flow chart of an embodiment of the method. In step 510, control data is received. Furthermore, in step 520, a frequency band is determined, in which data is to be transmitted to the radio-receiver circuit 10 during a subsequent time interval, based on the control data. Moreover, in step 530, at least one frequency characteristic of the analog-to-digital conversion unit 40 is adapted to the determined frequency band for receiving said data transmitted to the radio receiver circuit in said subsequent time interval.

As described above, the radio-receiver circuit 10 may be adapted to receive data over an OFDM communication channel, such as but not limited to an LTE communication channel. The control data may be comprised in one or more initial OFDM symbols of a sequence of consecutive OFDM symbols. The subsequent time interval may be a time interval that corresponds to one of the OFDM symbols of the sequence of consecutive OFDM symbols that follow after said one or more initial OFDM symbols. The frequency band in which data is to be transmitted to the radio receiver circuit 10 may be a frequency band within the OFDM symbol. In such an OFDM scenario, the step 510 of receiving control data may comprise setting the at least one frequency characteristic of the analog-to-digital conversion unit 40 to a default setting that facilitates reception of data in a frequency band covering the whole OFDM symbol. Furthermore, the step 530 of adapting at least one frequency characteristic of the analog-to-digital conversion unit 40 may comprise setting the at least one frequency characteristic to a setting that facilitates reception of data in the determined frequency band at a reduced power dissipation of the radio-receiver circuit 10 compared with the default setting.

Figure 9:
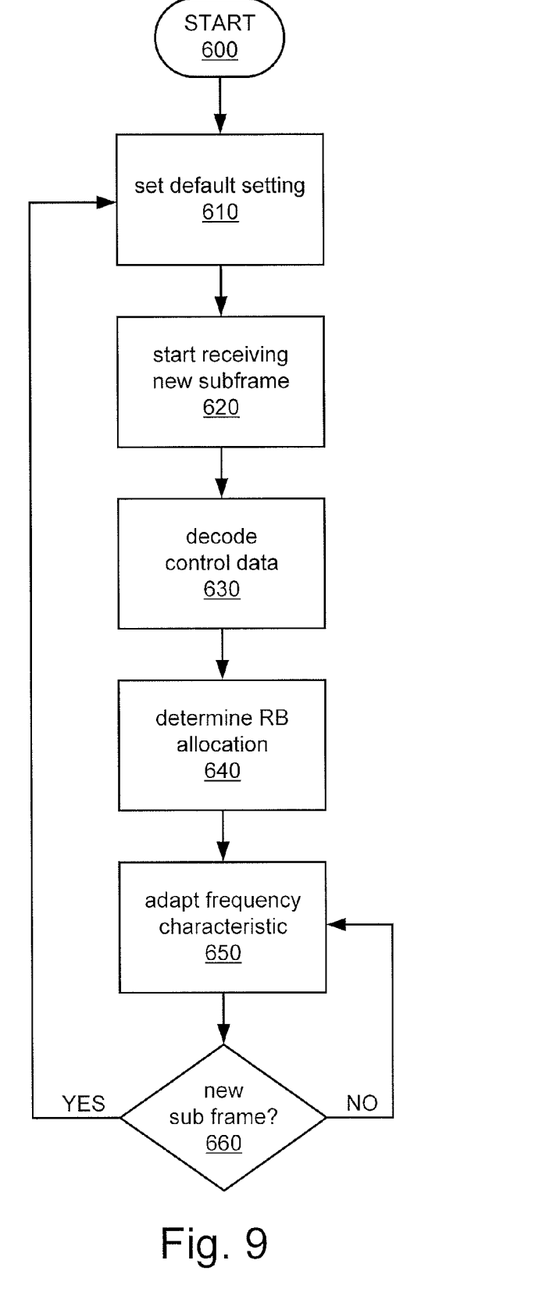

FIG. 9 shows a flow chart of an embodiment of the method, which may be employed e.g. in LTE. The method is started in step 600. In step 610, the analog-to-digital conversion unit 40 is set in the default setting, which facilitates reception of data in a frequency band covering the whole OFDM symbol. In step 620, the reception of a new subframe S0-S9 is started. The control data comprised in the first OFDM symbol(s) of the subframe S0-S9 is decoded in step 630. In step 640, the RBs that are allocated to the MT, in which the radio-receiver circuit 10 is comprised, are determined from the control data. Thereby, frequency bands are determined, in which data is to be transmitted to the radio receiver circuit 10 in the OFDM symbols of the subframe S0-S9. In step 650, the at least one frequency characteristic of the analog-to-digital conversion unit 40 is adapted to the frequency band in which data is transmitted to the radio-receiver circuit 10 in the following OFDM symbol. The adaptation may e.g. take place during the cyclic prefix as described above. In step 660, it is checked whether the end of the subframe has been reached and a new subframe is to be received. If the answer in step 660 is yes, the method returns to step 610, wherein the analog-to-digital conversion unit 40 is set to the default setting in order to facilitate reception of the control data of the following subframe. If the answer in step 660 is no, the method returns to step 650, wherein the at least one frequency characteristic of the analog-to-digital conversion unit 40 is adapted for the following OFDM symbol, e.g. during the cyclic prefix of said following OFDM symbol. Adapting the at least one frequency response for said following OFDM symbol in step 650 may include leaving parameter settings of the analog-to-digital conversion unit 40 untouched, e.g. in the event that data is to be transmitted to the MT in the same frequency band as before. Hence, parameter settings of the analog-to-digital conversion unit 40 need not necessarily be changed each time step 650 is executed; for example, if the same subcarriers are used for data transmission to the MT for two or more consecutive OFDM symbols, the same parameter settings may be used during said two or more consecutive OFDM symbols.

As described above, the ADC 50 may be implemented as a quantization-noise shaping ADC, e.g. a delta-sigma ADC. The steps 530 (FIG. 8) and 650 (FIG. 9) may comprise adapting the NTF of the quantization-noise shaping ADC to the determined frequency band, e.g. as described in the context of FIGS. 4 and 5a-b.

Additionally or alternatively, the steps 530 (FIG. 8) and 650 (FIG. 9) may comprise adapting the frequency response of the filter 60 to the determined frequency band, e.g. as described in the context of FIGS. 6 and 7a-c.

The control unit 70, or part thereof, may be comprised in a digital baseband circuit DBB (not shown). Alternatively, the control unit 70 may be a unit separate from the DBB. The control unit 70, or part thereof, may be implemented as a dedicated, application-specific, hardware unit. Alternatively or additionally, the control unit 70, or part thereof, may be implemented with one or more programmable hardware units, such as one or more microprocessors, microcontrollers, and/or field-programmable gate arrays (FPGAs), programmed and/or configured to perform the function of the control unit 70. Hence, embodiments of the invention may be embedded in a computer program product, which enables implementation of the method and functions described herein. Said embodiments of the invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

It is an advantage of embodiments of the present invention that the radio-receiver circuit 10 can be dynamically adapted to current utilization of the communication channel (e.g. in terms of signal bandwidth and/or bit rate), whereby a reduction of power dissipation is facilitated.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method of operating a radio-receiver circuit, wherein the radio-receiver circuit comprises an analog-to-digital conversion unit comprising an analog-to-digital converter, ADC, and a filter operatively connected to an input terminal of the ADC in a receive path of the radio-receiver circuit, the method comprising the steps of:
   receiving control data;
   determining, based on the control data, a frequency band in which data is to be transmitted to the radio-receiver circuit during a subsequent time interval; and,
   adapting at least one frequency characteristic of the analog-to-digital conversion unit to the determined frequency band for receiving said data transmitted in said subsequent time interval; wherein the radio-receiver circuit is adapted to receive data over an orthogonal frequency-division multiplexing (OFDM) communication channel, the control data is comprised of one or more initial OFDM symbols of a sequence of consecutive OFDM symbols, the subsequent time interval is a time interval corresponding to one of the OFDM symbols of the sequence of consecutive OFDM symbols that follow after said one or more initial OFDM symbols, and the frequency band in which data is to be transmitted to the radio receiver circuit is a frequency band within the OFDM symbol.

2. The method according to claim 1, wherein the step of receiving the control data comprises setting the at least one frequency characteristic of the analog-to-digital conversion unit to a default setting that facilitates reception of data in a frequency band covering the whole OFDM symbol; and, wherein the step of adapting the at least one frequency characteristic of the analog-to-digital conversion unit to the determined frequency band comprises setting the at least one frequency characteristic of the analog-to-digital conversion unit to a setting that facilitates reception of data in the determined frequency band at a reduced power dissipation of the radio-receiver circuit compared with the default setting.

3. The method according to claim 1, wherein the ADC is a quantization-noise shaping ADC, and the step of adapting at least one frequency characteristic of the analog-to-digital conversion unit to the determined frequency band comprises adapting a noise transfer function (NTF) of the quantization-noise shaping ADC to the determined frequency band.

4. The method according to claim 3, wherein the step of adapting the NTF of the quantization-noise shaping ADC to the determined frequency band comprises adapting the NTF such that a zero of the NTF appears essentially in the center of the determined frequency band.

5. The method according to claim 3, wherein adapting the NTF of the quantization-noise shaping ADC to the determined frequency band comprises adapting the NTF such that a total amount of quantization noise over the determined frequency band is essentially minimized.

6. The method according to claim 1, wherein the step of adapting at least one frequency characteristic of the analog-to-digital conversion unit to the determined frequency band comprises adapting a frequency response of the filter to the determined frequency band.

7. The method according to claim 6, wherein the step of adapting the frequency response of the filter to the determined frequency band comprises adapting a bandwidth of the filter to the determined frequency band.

8. The method according to claim 7, wherein the step of adapting the frequency response of the filter to the determined frequency band comprises adapting a filter order of the filter to the determined frequency band.

9. A non-transitory computer program product comprising computer program code means for executing the method according to claim 1 when said computer program code means are run by an electronic device having computer capabilities.

10. A non-transitory computer readable medium having stored thereon a computer program product comprising computer program code means for executing the method according to claim 1 when said computer program code means are run by an electronic device having computer capabilities.

11. A radio-receiver circuit, comprising:
an analog-to-digital conversion unit comprising an analog-to-digital converter (ADC);
a filter operatively connected to an input terminal of the ADC in a receive path of the radio-receiver circuit; and,
a control unit adapted to:
receive control data;
determine, based on the control data, a frequency band in which data is to be transmitted to the radio-receiver circuit during a subsequent time interval; and,
adapt at least one frequency characteristic of the analog-to-digital conversion unit to the determined frequency band for receiving said data transmitted in said subsequent time interval; wherein the radio-receiver circuit is adapted to receive data over an orthogonal frequency-division multiplexing (OFDM) communication channel, the control data is comprised of one or more initial OFDM symbols of a sequence of consecutive OFDM symbols, the subsequent time interval is a time interval corresponding to one of the OFDM symbols of the sequence of consecutive OFDM symbols that follow after said one or more initial OFDM symbols, and the frequency band in which data is to be transmitted to the radio receiver circuit is a frequency band within the OFDM symbol.

12. The radio-receiver circuit according to claim 11, wherein the control unit is adapted to:
set the at least one frequency characteristic of the analog-to-digital conversion unit to a default setting that facilitates reception of data in a frequency band covering the whole OFDM symbol for receiving the control data; and,
adapt the at least one frequency characteristic of the analog-to-digital conversion unit to the determined frequency band by setting the at least one frequency characteristic of the analog-to-digital conversion unit to a setting that facilitates reception of data in the determined frequency band at a reduced power dissipation of the radio-receiver circuit compared with the default setting.

13. The radio-receiver circuit according to claim 11, wherein the ADC is a quantization-noise shaping ADC and one of the at least one frequency characteristic of the analog-to-digital conversion unit is a noise transfer function (NTF) of the quantization-noise shaping ADC.

14. The radio-receiver circuit according to claim 13, wherein the control unit is adapted to adapt the NTF of the quantization-noise shaping ADC to the determined frequency band such that a zero of the NTF appears essentially in the center of the determined frequency band.

15. The radio-receiver circuit according to claim 13, wherein the control unit is adapted to adapt the NTF of the quantization-noise shaping ADC to the determined frequency band such that a total amount of quantization noise over the determined frequency band is essentially minimized.

16. The radio-receiver circuit according to claim 11, wherein one of the at least one frequency characteristic of the analog-to-digital conversion unit is a frequency response of the filter.

17. The radio receiver circuit according to claim 16, wherein the control unit is adapted to adapt a bandwidth of the filter to the determined frequency band.

18. The radio-receiver circuit according to claim 17, wherein the control unit is adapted to adapt a filter order of the filter to the determined frequency band.

19. An electronic apparatus comprising a radio-receiver circuit according to claim 11.

20. The electronic apparatus according to claim 19, wherein the electronic apparatus is selected from the group consisting of: a portable radio communication equipment, a mobile radio terminal, a mobile telephone, a communicator, an electronic organizer, a smartphone, and a computer.

* * * * *

UNITED STATES PATENT AND TRADEMARK OFFICE
CERTIFICATE OF CORRECTION

PATENT NO. : 8,477,886 B2
APPLICATION NO. : 12/991841
DATED : July 2, 2013
INVENTOR(S) : Lindoff et al.

It is certified that error appears in the above-identified patent and that said Letters Patent is hereby corrected as shown below:

In the Specification

In Column 11, Line 55, delete "control unit 60" and insert -- control unit 70 --, therefor.

In Column 11, Line 59, delete "210a andc" and insert -- 210a and c --, therefor.

In Column 11, Line 59, delete "control unit 60" and insert -- control unit 70 --, therefor.

In Column 11, Line 63, delete "control unit 60" and insert -- control unit 70 --, therefor.

In Column 12, Line 10, delete "control unit 60," and insert -- control unit 70, --, therefor.

Signed and Sealed this
Fifth Day of November, 2013

Teresa Stanek Rea
*Deputy Director of the United States Patent and Trademark Office*